L. S. DEMING.
Farm Gate.

No. 51,811.

Patented Jan'y 2, 1866.

WITNESSES

INVENTOR
Levi S. Deming

UNITED STATES PATENT OFFICE.

LEVI S. DEMING, OF NEWINGTON, CONNECTICUT.

IMPROVEMENT IN FARM-GATES.

Specification forming part of Letters Patent No. 51,811, dated January 2, 1866.

*To all whom it may concern:*

Be it known that I, LEVI S. DEMING, of Newington, county of Hartford, and State of Connecticut, have invented certain new and useful Improvements in Farm-Gates; and I do hereby declare that the same is described and represented in the following specification and drawings; and to enable others skilled in the art to make and use the same, I will proceed to describe its construction and operation by referring to the specification and drawings, in which the same letters indicate like parts in each of the figures.

The nature of this improvement will be readily understood from the specification and drawings, the object of which is to simplify the construction and render it more efficient and durable.

Figure 1:
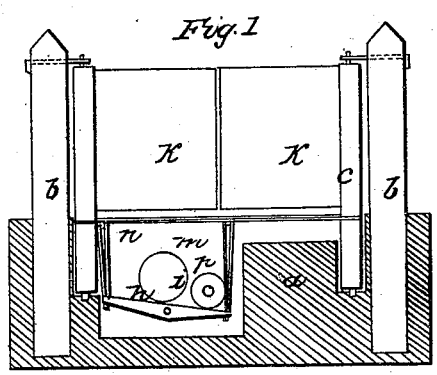
Figure 2:
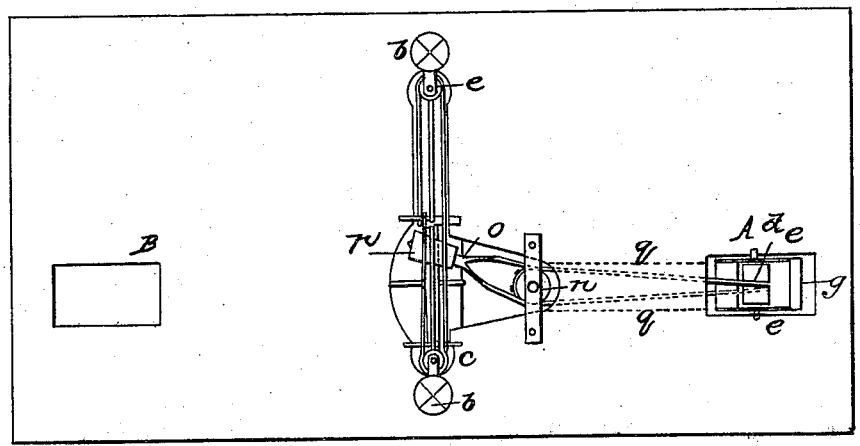

In the accompanying drawings, Figure 1 is a sectional elevation, showing the gates, posts, and operating mechanism. Fig. 2 is a top view, showing more clearly the operating mechanism.

$a$ is a block of wood, which represents the ground in which the posts are set, and the operating mechanism arranged therein.

$b$ are the posts.

$c$ are the hanging stiles or posts, into which the gates are framed or secured.

$d$ is a shaft or drum having arms $e$ secured thereon and extending each way, and having a weight, $f$, secured to the lower ends, and a cross-bar, $g$, secured to the upper ends. Said shaft or drum $d$ is secured and oscillates in bearings just below the surface of the ground in such a manner as to allow the weight to vibrate freely under the shaft or drum to hold the arms, with the cross-piece $g$ in a perpendicular position when not in use or in readiness for use.

$h$ is an oscillating bar, hung through its center upon a shaft, $i$, under and in line with the gates $k$, (when closed,) and below the surface of the ground. Suitable connections are provided, such as chains, rods, or cords, one end of which is placed around the stile or post $c$ and secured thereto, while the other end is brought over a pulley or rod, $m$, thence down and secured to one end of the bar $h$, and another connection is placed around the stile in the opposite direction and secured thereto, thence over another pulley or rod, directly over the opposite end of said bar $h$, and down and secured thereto, so that when one end of the bar descends it opens the gate, and when it rises will close the gate. The connections from the other gate to the bar $h$ are formed in the same way.

$n$ is a perpendicular post or drum, also placed below the surface of the ground. From this drum extends arms, which terminate in a shaft or fulcrum, $o$, upon which is mounted a rolling weight, $p$, which rests and works upon the oscillating bar $h$ to open and close the gates. Chains, rods, or cords $q$ are employed to connect the action of the drum $n$ with the action of the drum $d$. The mechanism may be arranged in an area formed of wood or masonry.

$d\ e\ f\ g$ constitute what I will here call a "brake," A B, which, in practice, are two in number, one inside of the gates and one outside of the gates. Thus it will be seen that when the brake A is in a direction toward the gates the connections $q$ will operate the drum $n$ and move the weighted roller $p$ to the opposite end of the bar $h$ and depress said bar by its weight, and thereby throw open the gate, by means of the connections $q$, in the opposite direction from that from which the brake is operated, and as the person or carriage passes through the gates and operates the opposite brake at B the gate will again close.

Thus I am enabled to produce a substantial, efficient, and durable gate, not liable in any way to be out of order.

I believe I have thus shown the nature, construction, and operation of my improvement so as to enable others skilled to make and use the same.

What I claim, therefore, and desire to secure by Letters Patent, is—

The combination of the bar $h$, weight $p$, with the brakes A, gates $k$, substantially in the manner as and for the purpose described.

LEVI S. DEMING.

Witnesses:
SETH B. KING,
JEREMY W. BLISS.